United States Patent
Reiderman et al.

(10) Patent No.: US 10,895,659 B2
(45) Date of Patent: Jan. 19, 2021

(54) DETECTING NUCLEAR MAGNETIC RESONANCE LOGGING TOOL MOTION

(71) Applicant: Halliburton Energy Services, Inc., Houston, TX (US)

(72) Inventors: Arcady Reiderman, Richmond, TX (US); Songhua Chen, Katy, TX (US); Mark Cheiron Butler, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 35 days.

(21) Appl. No.: 16/388,372

(22) Filed: Apr. 18, 2019

(65) Prior Publication Data

US 2020/0333502 A1 Oct. 22, 2020

(51) Int. Cl.
*G01V 3/32* (2006.01)
*G01V 99/00* (2009.01)
*G01V 3/38* (2006.01)

(52) U.S. Cl.
CPC .................. *G01V 3/32* (2013.01); *G01V 3/38* (2013.01); *G01V 99/005* (2013.01)

(58) Field of Classification Search
CPC .......... G01V 3/32; G01V 99/005; G01V 3/38
See application file for complete search history.

(56) References Cited

U.S. PATENT DOCUMENTS

| | | | |
|---|---|---|---|
| 6,268,726 B1 * | 7/2001 | Prammer | G01V 3/32 324/303 |
| 6,297,632 B1 * | 10/2001 | Speier | G01N 24/081 324/303 |
| 6,437,564 B1 | 8/2002 | Itskovich et al. | |
| 6,459,263 B2 | 10/2002 | Hawkes et al. | |
| 6,518,756 B1 * | 2/2003 | Morys | E21B 47/00 324/300 |
| 6,534,980 B2 | 3/2003 | Toufaily et al. | |
| 6,566,874 B1 | 5/2003 | Speier et al. | |
| 6,891,369 B2 | 5/2005 | Hurlimann et al. | |
| 7,180,287 B2 | 2/2007 | Rottengatter et al. | |
| 7,268,547 B2 | 9/2007 | Kruspe et al. | |
| 7,339,374 B2 | 3/2008 | Blanz | |
| 7,358,725 B2 | 4/2008 | Blanz | |
| 8,941,383 B2 | 1/2015 | Hopper et al. | |
| 2002/0153888 A1 * | 10/2002 | Kruspe | E21B 49/008 324/303 |
| 2003/0132749 A1 | 7/2003 | Speier et al. | |
| 2004/0251898 A1 | 12/2004 | Morys et al. | |
| 2015/0061664 A1 | 3/2015 | Reiderman et al. | |
| 2016/0202384 A1 | 7/2016 | Utsuzawa et al. | |
| 2019/0056524 A1 | 2/2019 | Reiderman | |

OTHER PUBLICATIONS

PCT Application Serial No. PCT/US2019/028241, International Search Report, dated Jan. 17, 2020, 4 pages.
PCT Application Serial No. PCT/US2019/028241, International Written Opinion, dated Jan. 17, 2020, 7 pages.

* cited by examiner

*Primary Examiner* — Susan S Lee
(74) *Attorney, Agent, or Firm* — Gilliam IP PLLC

(57) ABSTRACT

Methods, devices, and systems for tracking lateral motion of a nuclear magnetic resonance (NMR) tool are disclosed. In some embodiments, a phase shift for one or more spin-echo signals received by the NMR tool is detected during a velocity measurement sequence that corresponds to at least one formation measurement sequence. A lateral velocity of the NMR tool is determined based, at least in part, on the detected phase shift.

19 Claims, 9 Drawing Sheets

DETECTING NUCLEAR MAGNETIC RESONANCE LOGGING TOOL MOTION

TECHNICAL FIELD

The disclosure generally relates to the field of nuclear magnetic resonance (NMR) logging and more particularly to characterizing NMR logging tool motion during logging operations.

BACKGROUND ART

Nuclear magnetic resonance (NMR) is utilized to evaluate hydrocarbon formation material properties such as porosity and fluid saturation levels. Downhole NMR measurement, widely referred to as NMR logging, entails evaluation of element-specific nuclei electromagnetic resonance responses to derive petrophysical properties such as porosity and/or fluid saturation of formation material such as formation rock. NMR logging includes detecting the induced magnet moment of hydrogen protons within the fluid-filled pore space of porous formation material such as sandstone. Due to the relatively high concentration of hydrogen protons in pore fluids, NMR logging provides an effective measure of the composition, volumetric concentration, and distribution of formation fluids such as hydrocarbon oils and gases and water.

A typical NMR logging cycle includes a nuclei polarization phase in which a static magnetic field is applied to formation materials to align (polarize) the protons in the formation fluid from the random state. A NMR logging cycle further includes a measurement sequence in which precisely timed/spaced radio frequency (RF) magnetic pulse sequences are transmitted using a particularly frequency into the pre-polarized formation material. Resultant spin-echo signals from the formation protons are received and measured to determine formation properties.

BRIEF DESCRIPTION OF THE DRAWINGS

Embodiments of the disclosure may be better understood by referencing the accompanying drawings.

DESCRIPTION OF EMBODIMENTS

Figure 1:
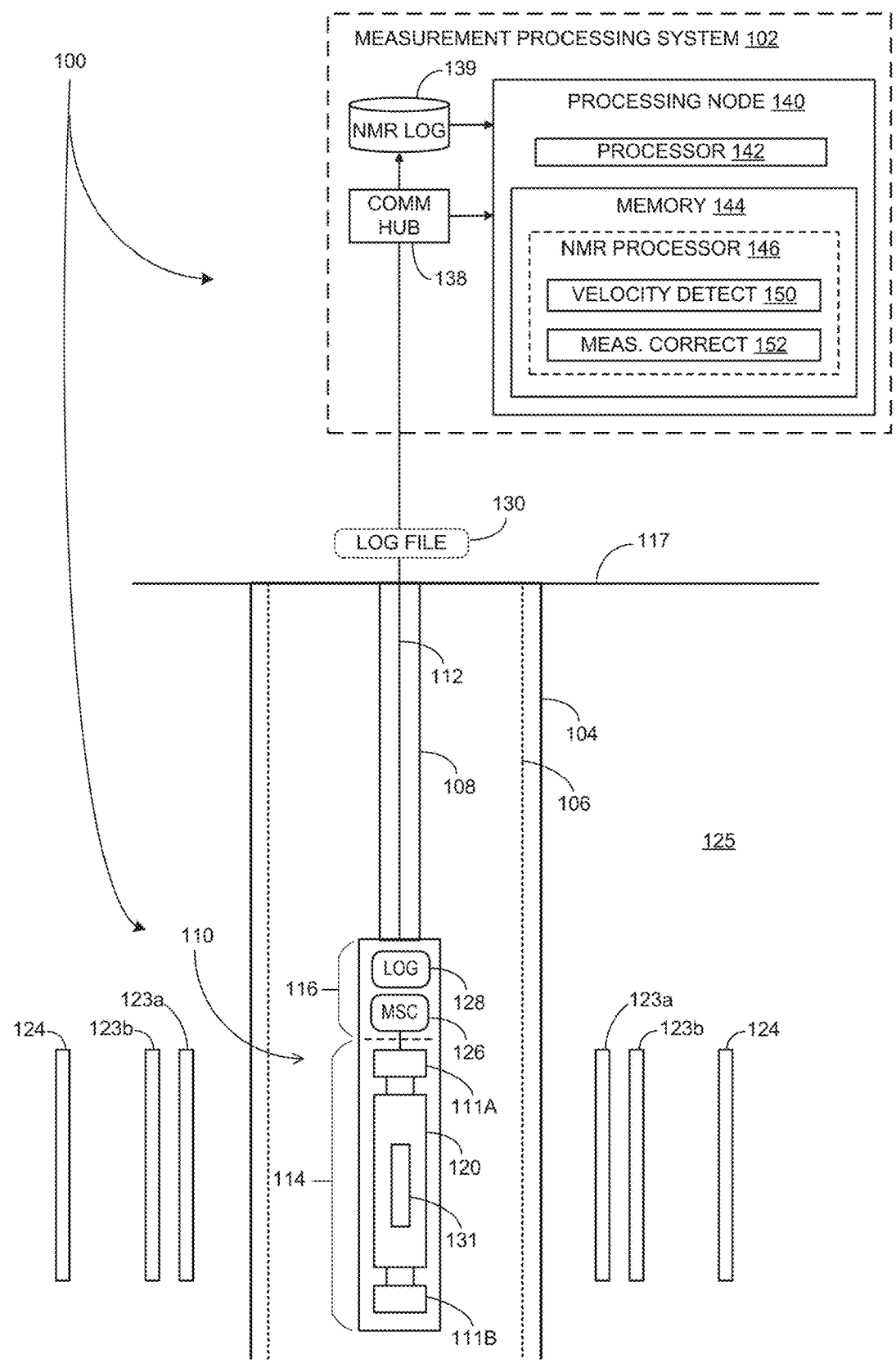
FIG. 1 is a block diagram depicting an NMR measurement system in accordance with some embodiments.

The description that follows includes example systems, methods, techniques, and program flows that embody embodiments of the disclosure. However, it is understood that this disclosure may be practiced without some of these specific details. In other instances, well-known instruction instances, protocols, structures and techniques have not been shown in detail in order not to obfuscate the description.

Overview

Downhole NMR sensors have a relatively small radial extent of the sensitivity area making NMR well logging data sensitive to lateral (radial) motion of the tool. In the case of NMR logging during logging while drilling (LWD) the lateral vibration motion along with rotation may cause distortion of the NMR data and even inability to acquire a spin-echo signal indicating transversal NMR relaxation. While rotational sensitivity may be reduced by designing the sensor tool to be axially symmetric, the lateral displacement over time due to tool motion remains a significant issue. The disclosed embodiments provide an efficient means of leveraging NMR components in a manner that the displacement over time (velocity) is determined in conjunction with NMR formation measurements so that, for example, the velocity information can later be used to filter or adjust NMR formation measurements.

Disclosed embodiments include systems, sub-systems, devices, components, and operations for determining the motion of an NMR logging tool during NMR logging operations. A system for determining lateral tool motion may include an NMR tool configured to implement a dual measurement cycle. The dual measurement cycle includes a velocity measurement (VM) sequence that corresponds to one or more formation measurement (FM) sequences. The FM sequence(s) and corresponding VM sequence may be preceded by a polarization phase in which a static magnetic field is applied for period over which formation nuclei exposed to the field reach thermal equilibrium. During the VM sequence, one or more RF magnetic pulses are transmitted at a specified frequency and one or more resulting spin-echo signals are quadrature detected to determine phase distortion in the form of phase shift of the spin-echo signals. An initial lateral tool velocity for the FM sequence to which the VM sequence corresponds is determined based, at least in part, on the determined phase shift.

In some embodiments, the initial lateral velocity information may be processed by a spin dynamic correction component to correct spin-echo signal attributes, such as amplitude, measured during the FM sequence. Instantaneous acceleration of the logging tool may be detected and utilized to determine the instantaneous velocity of the NMR tool over FM sequences based on the initial velocities and variations in detected accelerations during FM sequences. The NMR tool may include a monopole antenna for receiving and measuring the spin-echo signals in an azimuthally selective manner, enabling phase sensitive spin-echo response measurement during the VM sequences. In some embodiments, the NMR tool is configured to generate corresponding pairs of FM and VM pulse sequences in which each VM sequence may precede or follow a corresponding FM sequence. In some embodiments, the NMR tool is configured to generate VM pulse sequences comprising an excitation pulse and one or more refocusing pulses having a uniform pulse interval. In some embodiments, the NMR tool is configured to generate a VM pulse sequence comprising an excitation pulse followed by a first refocusing that is delayed from the excitation pulse by a first interval and two or more subsequent refocusing pulses mutually offset by a second interval that is substantially shorter than the first interval.

Example Illustrations

FIG. 1 is a block diagram depicting an NMR measurement system 100 in accordance with some embodiments. NMR measurement system 100 includes a measurement processing system 102 that may be incorporated in part or in whole within the electronics equipment of a well head apparatus (not expressly depicted). Such a well head apparatus may include mechanical, electrical, and electronic systems, subsystems, devices, and components for drilling a borehole 104 and subsequently retrieving hydrocarbon fluid from or injecting fluid into a subterranean region 125. Subterranean region 125 may include sedimentary layers, rock layers, sand layers, or combinations of these and other types of subsurface layers. One or more of the subsurface layers may contain fluids, such as water and liquid and/or gaseous hydrocarbon fluids. Although the portion of borehole 104 shown in FIG. 1 is vertically oriented, NMR measurement system 100 may be implemented within other borehole orientations such as horizontal or otherwise.

The example NMR measurement system 100 includes an NMR tool 110 communicatively coupled with measurement processing system 102. NMR tool 110 is a downhole-deployed NMR logging tool that operates while deployed at various positions along the length of borehole 104. In some implementations, NMR tool 110 measures NMR response signals, referred to as spin-echo signals, by applying a static magnetic field to polarize nuclear spins of material within subterranean region 125 and subsequently applying magnetic radio frequency (RF) pulses to the polarized nuclei. Various RF pulse sequences may be generated to induce the spin-echo signals, including the Carr Purcell Meiboom Gill (CPMG) sequence in which nuclei spins are initially tipped using a tipping, or excitation pulse followed by a series of refocusing pulses.

Measurement processing system 102 operates at or above a terrain surface 117, for example, within or proximate to a well head apparatus. Measurement processing system 102 is configured to control NMR tool 110 and other downhole equipment including drilling components used for logging while drilling (LWD) configurations. Measurement processing system 102 is further configured to receive and process measurement information collected and generated by NMR tool 110. In some embodiments, all or part of measurement processing system 102 may be implemented as a component of, or may be fully or partially integrated with one or more components of NMR tool 110. For instance, one or more components of a processing node 140 within measurement processing system 102 may be embedded within NMR tool 110 and operate concurrently with ongoing measurement operations of NMR tool 110 while deployed within borehole 104.

Within measurement processing system 102, processing node 140 includes processing and storage components configured to receive and process detected NMR information such as in the form of spin-echo attribute data. For example, spin-echo attributes may include the amplitude(s) and decay time of a series of spin-echo signals. A communication hub 138 enables signal transmission between locally networked or otherwise communicatively coupled components. Communication hub 138 may include routing components configured to enable simultaneous, multi-lateral signal transmission between processing node 140, NMR tool 110, and other local components. During logging operations, NMR tool 110 is disposed at various depths within borehole 104 while communicatively coupled to communication hub 138 via a telemetry link 112. Telemetry link 112 may comprise components and connectivity media for establishing acoustic, optical, electronic, and/or electromagnetic communications links between NMR tool 110 and measurement processing system 102.

Figure 2:
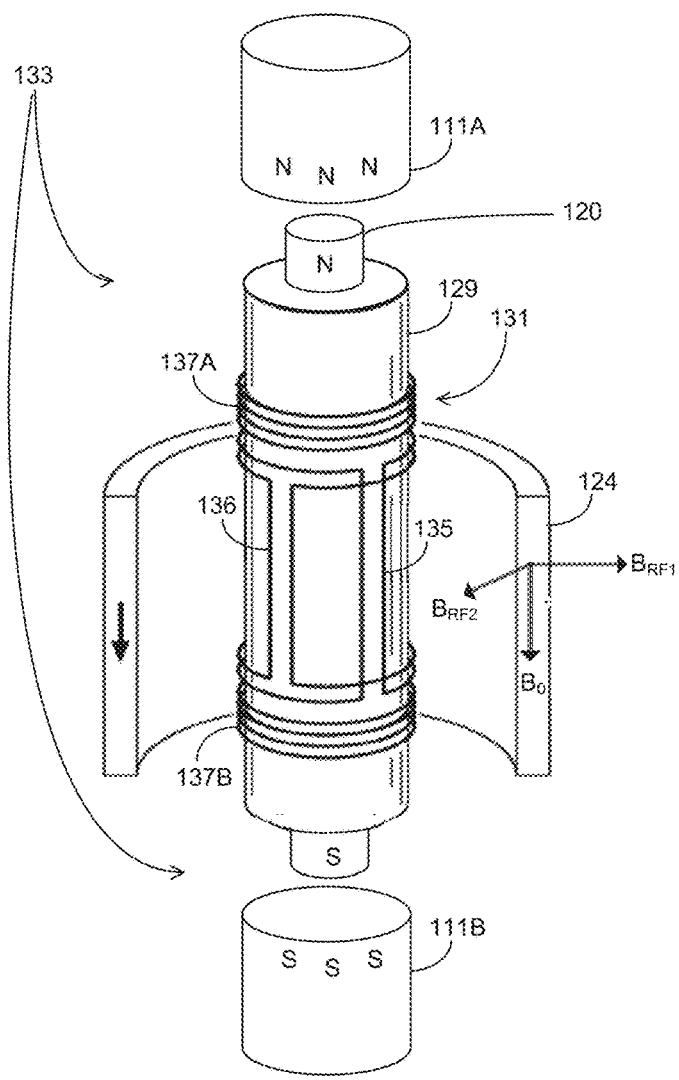
FIG. 2 illustrates magnet assembly and antenna assembly portions of an NMR logging tool that may be utilized in an NMR measurement system to detect phase shifts corresponding to lateral tool motion in accordance with some embodiments.

NMR tool 110 comprises a logging sonde 114 and an electronics assembly 116. Logging sonde 114 includes a magnet assembly that generates a static magnetic field applied during a nuclei polarization phase. Logging sonde 114 also includes an antenna assembly configured to generate magnetic RF pulses and receive spin-echo response signals. FIG. 2 illustrates a magnet assembly 133 and an antenna assembly 131 that may be included in logging sonde 114 of NMR tool 110. Magnet assembly 133 is configured to generate a static magnetic field and antenna assembly 131 is configured to generate magnetic RF pulses at specified frequencies and to receive resulting induced spin-echo signals that are utilized to detect phase shifts corresponding to lateral tool motion in accordance with some embodiments.

As shown in FIG. 2 in conjunction with FIG. 1, magnet assembly 133 comprises a central magnet 120 and a pair of end piece magnets 111A and 111B that are spaced apart from the distal ends of central magnet 120. Central magnet 120 is primary configured to shape and strengthen the static magnetic field, $B_0$, within one or more sensitive regions such as depicted annular sensitive volume 124. In combination, end pieces 111A and 111B and central magnet 120 form four magnetic poles arranged to generate an azimuthally uniform and radially decaying static magnetic field within sensitive volume 124. The direction of the static magnetic field, $B_0$, is shown in FIG. 2 as oriented in parallel with the longitudinal tool axis of NMR tool 110.

Antenna assembly 131 comprises antenna and magnetic core components disposed at respective locations along the longitudinal tool axis. Antenna assembly 131 is configured to induce and detect NMR responses, such as spin-echo signals, from one or more sensitive volumes such as sensitive volume 124. In FIG. 2, antenna assembly 131 includes a soft magnetic core 129 on which are disposed transversal-dipole antennas and monopole antennas. The transversal-dipole and monopole antennas are configured to obtain a unidirectional azimuthally-selective NMR response. As depicted in FIG. 2, the dipole antennas comprise a pair of orthogonal transverse-dipole antennas 135 and 136. Dipole antennas 135 and 136 are configured to generate two orthogonal RF magnetic fields BRF1 (generated by 135) and BRF2 (generated by 136) having a 90° mutual phase difference. The two fields are combined to produce a circular polarized RF magnetic field.

Figure 3:
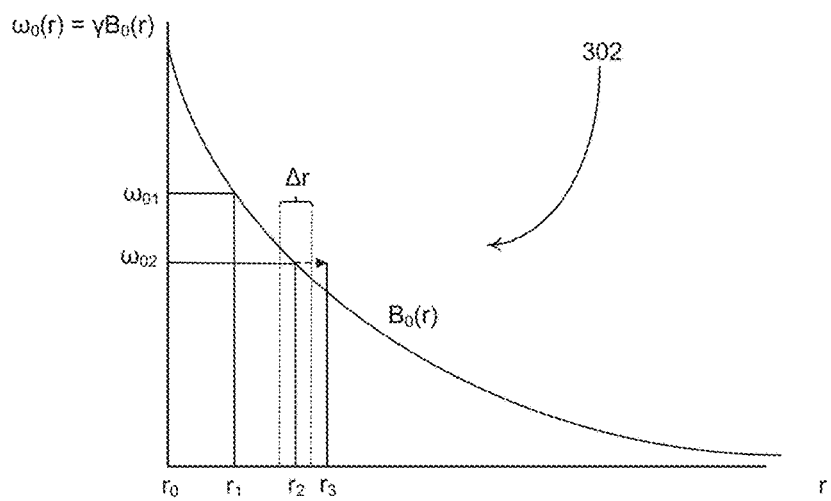
FIG. 3 is a magnetic field diagram illustrating the effects of lateral NMR tool motion on sensitive volume location with respect to an applied magnetic field.

The magnet assembly 133 of NMR tool 110 generates a radially decaying static magnetic field across a circular region within subterranean region 125. FIG. 3 is a magnetic field diagram illustrating the effect of lateral NMR tool motion on displacement of an applied magnetic field with respect to a sensitive volume. Specifically, FIG. 3 depicts a magnetic field curve 302 corresponding to the decaying field strength, $B_0$, at various radial distances from the NMR tool. As shown, the field is at a maximum at the NMR tool surface $r_0$ and radially decays so that the Larmor frequency, which is proportional to the static magnetic field, $B_0$, also decays radially. Selecting a Larmor frequency for the RF pulses determines selection of a sensitivity region at a certain radial distance from the tool. At a radial distance, $r_2$, within a selected sensitivity volume such as volume 124, the Larmor frequency is $\omega_{02}$. Therefore, to perform NMR measurement for a sensitivity volume centered at approximately $r_2$, the antenna assembly generates RF pulse signals having frequency of $\omega_{02}$. The sensitivity volume, also referred to as excitation region, has a thickness or radial extent determined by the static field gradient and the bandwidth $\Delta\omega_0$ of the excitation/refocusing RF signal. The sensitivity volume for excitation frequency $\omega_{02}$ is depicted in FIG. 3 as having a radial extent of $\Delta r$.

The radial extent is generally relatively narrow, typically on the order of 1-10 mm. Therefore, testing of a given sensitive volume, which includes first polarizing the volume, is very sensitive to lateral motion of the NMR tool during the measurement sequence. As shown in FIG. 3, a relatively small lateral motion of the NMR tool can result in the Larmor frequency occurring out of the previously polarized volume position at a radial position, $r_3$. The resultant spin-echo signals from the relatively non-polarized volume proximate $r_3$ will therefore be distorted and possibly out of detection range.

The NMR measurement system depicted in FIGS. 1 and 2 includes a lateral velocity detection system that includes components and performs operations for addressing the distortion introduced by lateral motion/displacement of an NMR tool. The lateral velocity detection system includes components and operations for determining phase shifts for spin-echo signals and deriving the lateral velocity based, at least in part, on the determined phase shifts. The determined lateral motion (e.g., directional lateral displacement in the transverse plane per unit time) can then be incorporated into post-measurement processing to correct for spin-echo results that coincide with lateral motion.

The embodiment depicted in FIGS. 1 and 2 includes NMR tool 110 configured to provide azimuthally symmetric NMR measurements while enabling azimuthally directed phase shift/lateral motion detection. In the case of an NMR tool with azimuthally symmetric distribution of magnetic fields, lateral motion of the tool causes spin-echo phase accumulation in the areas of the sensitive volume with non-zero projection of the lateral velocity onto the static magnetic field gradient. Since the directions of the gradient on each of two opposite sides of the sensitive volume (i.e., volume region facing diametrically opposite sides of the tool) are opposite, the phase shift of the echo signals from these regions of the sensitive volume cancel each other.

To enable azimuthally directed phase detection while preserving azimuthally comprehensive spin-echo detection (e.g., detection of spin-echo amplitude/decay), the depicted NMR tool includes a combined dipole and monopole antenna assembly. For instance, in addition to the dual transverse-dipole antennas 135 and 136, antenna assembly 131 includes a monopole antenna comprising two coils 137A and 137B connected in mutually reverse polarity. The depicted arrangement of coils 137A and 137B to form the monopole antenna are configured to locally generate a substantially radially-directed magnetic field, i.e., a field that could otherwise be produced by a single "magnetic charge" or magnetic pole. As utilized herein, the term "monopole" is utilized to distinguish this type of magnetic field from a dipole magnetic field.

During a measurement sequence, dipole antennas 135 and 136 receive the spin-echo signals induced by the excitation pulse and re-focusing pulse train. During the time-to-echo time interval, TE, between each generated RF pulse in a measurement sequence, one or both dipole antennas receive a resultant induced spin-echo signal from sensitive volume 124. The amplitude and phase attributes of the spin-echo signals received by antenna assembly 131 are processed by spin-echo receiver components within the electronics assembly 116 of NMR tool 110. Electronics assembly 116 includes, in part, a measurement sequence controller 126 configured to implement NMR measurement cycles comprising a polarization phase followed by measurement pulse sequences. Electronics assembly 116 further includes a log unit 128 that is configured to compute spin-echo signal attributes such as amplitude and decay rate/period from the spin-echo signals received from sequence controller 126. The spin-echo signal attributes may be translated by inversion processes into dimensionally specified porosity and other formation material property values by components within electronics assembly 116 and/or components within measurement processing system 102.

As depicted and described in further detail with reference to FIGS. 4, 5A, 5B, 6, and 7, sequence controller 126 is further configured to implement velocity measurement (VM) sequences in alternating/interleaved manner with corresponding formation measurement (FM) sequences used to determine formation properties from spin-echo train attributes. Sequence controller 126 may include program components that generate each of the VM sequences in coordination with and immediately following or preceding a corresponding FM sequence. The alternating pairs of FM and VM sequences are included in an overall NMR measurement cycle that includes a polarization phase in which the static magnetic field is applied to bring target formation nuclei into thermal equilibrium. Following polarization, the FM and VM sequences entail antenna assembly 131 generating one or more RF magnetic pulses and receiving one or more corresponding spin-echo signals.

The logging unit 128 within electronics assembly 116 is configured, using any combination of hardware and software components, to process the received series of spin-echo signals (sometimes referred to as a spin-echo train). Logging unit 128 may include a quadrature detector and other spin-echo processing components for processing the spin-echo signals received during the FM and VM sequences. The quadrature detector includes a demodulator for processing phase-offset versions of a spin-echo signal carried on first and second signal channels of the detector. During an FM sequence, signal processing components of logging unit 128 process the output of the quadrature detected spin-echo signals to determine spin-echo attributes such as amplitude that are further processed to determine echo train decay from which formation properties may be derived. During a VM sequence, signal processing components of logging unit 128 process the output of the quadrature detected spin-echo signals to determine phase distortion, such as in the form of phase shifts, of the spin-echo signals.

As depicted in FIG. 3, the resonance/Larmor frequencies for the RF pulses vary in accordance with the radially decaying static magnetic field. To execute VM sequences, sequence controller 126 is configured to select the frequencies of the generated magnetic RF pulses. In some embodiments in which each VM sequence precedes a corresponding FM sequence, sequence controller 126 selects the excitation frequency of the VM sequences to be different than the excitation frequency applied for the FM sequences. In this manner, the sensitivity volume that is polarized and subsequently resonance analyzed during the VM sequence is different than the formation volume polarized and resonance analyzed during the FM sequence. Referring to FIG. 1, the excitation/re-focusing frequency of the FM pulse sequence may be set to polarize and resonance analyze a formation volume 124, and the excitation/re-focusing frequency of the VM pulse sequence may be set to polarize and resonance analyze an offset formation volume 123a. As depicted and described in further detail with reference to FIGS. 4 and 5A sequence controller 126 may be configured to generate two RF pulse sequences each having a distinct resonance frequency during the same VM measurement sequence. As shown in FIG. 1, the use of different excitation frequencies results in excitation of two different offset volumes 123a and 123b.

NMR tool 110 may collect the VM sequence and FM sequence data at discrete logging positions within borehole 104. For example, NMR tool 110 can move upward or downward incrementally to each logging point at a series of depths within borehole 104. At each logging point, instruments in NMR tool 110 performs NMR measurements on the subterranean region 125. The measurement data can be communicated to processing node 140 within measurement processing system 102 for storage, processing, and analysis. Such data may be gathered and analyzed during drilling operations (e.g., during logging while drilling (LWD) operations), during wireline logging operations, or during other types of downhole operations. Processing node 140 is configured to receive and analyze the spin-echo data from NMR tool 110 to detect properties of various subsurface layers. For example, processing node 140 may be configured to identify the viscosity, porosity, material content, or other properties of the subsurface layers based on the NMR measurements (e.g., spin-echo attribute data) acquired by NMR tool 110.

The spin-echo phase data including phase shift collecting during VM sequences and other spin-echo attributes such as amplitude collecting during FM sequences may be recorded by logging unit 128 in defined data object structures such as a log file 130. Log file 130 is transmitted from electronics assembly 116 to communication hub 138 from which it may be routed to and recorded in an NMR log 139. Log file 130 may also or alternatively be provided directly as streamed data or otherwise real-time formatted data to processing node 140. Processing node 140 is configured, using any combination of hardware and software devices and program components, to generate one or more formation models that include formation material property values such as porosity values. The hardware within processing node 140 includes a processor 142 configured to execute instructions corresponding to program instructions loaded into an associated memory device 144. The software stored or retrieved by or otherwise accessible for loading into memory 144 includes an NMR processor component 146, which is configured to implement lateral tool motion detection and formation model generation.

The spin-echo data are received by NMR processor 146 from NMR log 139 and/or directly from communication hub 138. NMR processor 146 is configured using any combination of program instructions to determine and utilized tool lateral motion information to filter or otherwise correct NMR measurement data. NMR processor 146 determines tool lateral velocity based on phase shift and other information from NMR tool 110. As shown, NMR processor 146 includes a velocity detector 150 comprising program instructions configured to determine lateral velocities of NMR tool 110 during FM sequences. In some embodiments, the lateral velocity values are determined by velocity detector 150 based, at least in part, on phase shifts of spin-echo signals received during corresponding VM sequences that each immediately follow or precede a corresponding FM sequence. NMR processor 146 further includes a measurement correction unit 152 configured, using any combination of program logic, to receive, filter, or otherwise modify spin-echo attribute information generated during the FM sequences based on the lateral velocity information.

Figure 4:
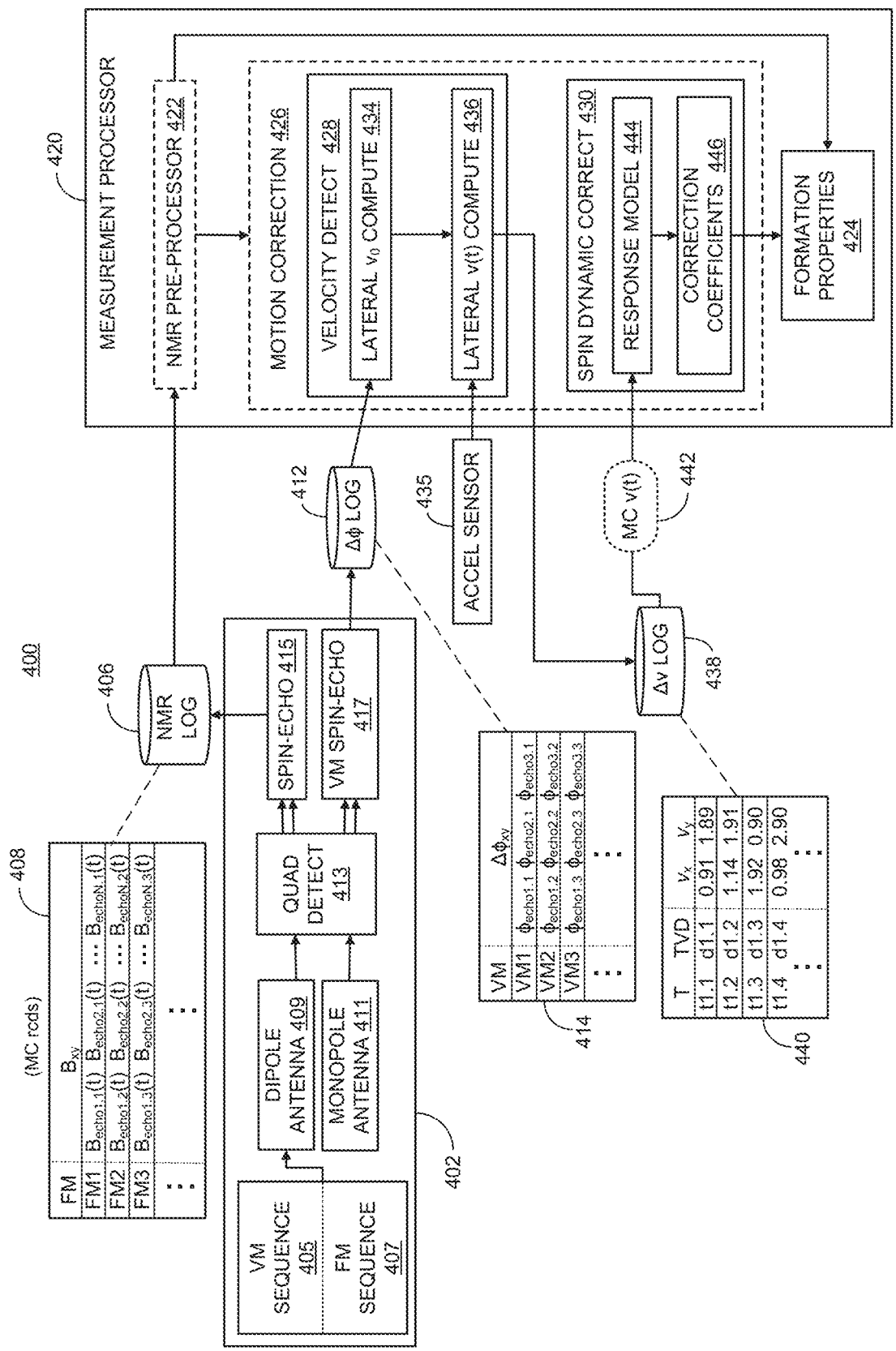
FIG. 4 is a block diagram depicting an NMR measurement system in accordance with some embodiments.

FIG. 4 is a block diagram depicting an NMR measurement system 400 in accordance with some embodiments. The sub-systems, devices, and components depicted and described with reference to FIG. 4 may be implemented in the measurement system 100 depicted in FIG. 1. NMR measurement system 400 includes a logging tool 402 configured to implement dual sequence (FM and VM sequence) spin-echo measurements. Logging tool 402 includes program components including a VM sequence unit 405 and an FM sequence unit 407 that may be incorporated within a sequence controller component such as sequence controller 126. VM sequence unit is configured using any combination of hardware and program instructions to generate RF pulse sequences for VM sequences that alternate with FM sequences generated by FM sequence unit 407. VM sequence unit 405 or another component within the sequence controller implements a polarization phase during which a magnet assembly within the NMR tool, such as magnet assembly 133, applies a static magnetic field to bring formation nuclei into to close to thermal equilibrium. During polarization, the static magnetic field is applied to proximate formation material without magnetic RF pulses. Following polarization, VM sequence unit 405 in conjunction with a logging tool dipole antenna 409, generate and transmit a sequence of one or more RF pulses during a VM sequence.

In some embodiments, logging tool 402 is configured to implement CPMG type RF pulse sequences during VM and FM sequences. In such instances, VM sequence unit 405 and dipole antenna 409 generate and transmit a series of RF pulses comprising an excitation pulse followed by a series of one or more refocusing pulses. The excitation and refocusing pulses have magnetic fields that are transverse/perpendicular to the static magnetic field and induce an echo train of one or more spin-echo signals. The VM sequence is substantially shorter in time, comprising substantially fewer RF pulses, than a standard CPMG or other NMR RF pulse sequence. However, the pulse interval (e.g., time interval between an excitation pulse and a subsequent refocusing pulse) may be substantially longer for the VM sequence than for a corresponding FM sequence. The spin-echo signals induced during a VM sequence are detected by a quadrature detector 413 that generates two orthogonal channels that carry the spin-echo signals. The pair of quadrature channel outputs are received and processed by a velocity measurement (VM) spin-echo unit 417 that is configured to measure phase shifts caused by lateral velocity induced phase accumulations of the spin-echo signals during each VM sequence.

VM spin-echo unit 417 generates and transmits the phase shift information to a phase shift log 412 that is configured to record the phase shift values for the spin-echo signals received during respective VM sequences. For example, a log record 414 contains individual entries corresponding to each VM sequence executed during an overall NMR measurement process for a given borehole. Each entry/record in log record 414 associates a VM sequence identifier code (e.g., VM1, VM2, etc.) with a set of one or more phase shift values determined for the one or more spin-echo signals. For instance, the second row-wise entry within log record 414 associates an VM ID "VM2" with three phase shift values (in degrees or radians, for example) corresponding to a first spin-echo received for the second VM sequence ($\phi_{echo1,2}$), a second spin-echo received for the second VM sequence ($\phi_{echo2,2}$), and a third spin-echo received for the second VM sequence ($\phi_{echo3,2}$).

Logging tool 402 further includes FM sequence unit 407 that generates FM sequences each corresponding to a respective VM sequence. FM sequence unit 407 is configured using any combination of hardware and program instructions to generate RF pulse sequences for FM sequences that are associated in an alternating manner with the VM sequences. In some embodiments in which each FM sequence precedes a corresponding VM sequence, FM sequence unit 407 executes a polarization phase during which the magnet assembly applies the static magnetic field in the absence of RF pulses. Following the polarization period, FM sequence unit 407 in conjunction with dipole antenna 409, generate and transmit a sequence of one or more RF pulses having a specified pulse interval and comprising signal component having the selected resonant frequency.

For embodiments in which logging tool 402 is configured to implement CPMG type sequences, FM sequence unit 407 and dipole antenna 409 generate and transmit an FM sequence comprising an excitation RF pulse followed by a series of one or more refocusing pulses that induce an echo train of one or more spin-echo signals. The FM sequence is substantially longer in time, comprising a substantially greater number of RF pulses, than a corresponding VM sequence. The interval between each of the RF pulses is typically uniform and substantially shorter than the interval between each consecutive RF pulse in the corresponding VM sequences. The spin-echo signals are detected by quadrature detector 413 that generates two quadrature detection channel outputs. The pair of quadrature channel outputs are received and processed by spin-echo unit 415 that is configured to measure or otherwise determine spin-echo attribute information such as amplitude information based on the spin-echo signals.

Spin-echo unit 415 generates the spin-echo attribute information and transmits the information to an NMR log 406 that is configured to record the spin-echo attribute values for each spin-echo signal received during respective FM sequences. For example, a log record 408 contains individual entries corresponding to each measurement cycle executed during an overall NMR measurement process for a given borehole. Each entry/record in log record 408 associates an FM sequence ID code with a set of one or more spin-echo attributes such as echo magnitude determined for the one or more spin-echo signals. For instance, the third row-wise entry within log record 408 associates an FM sequence ID "FM3" with N (e.g., N=300) echo magnitude values corresponding to a first spin-echo received for the third FM sequence ($B_{echo1,3}$), a second spin-echo received for the third FM sequence ($B_{echo2,3}$), etc.

Figure 5A:
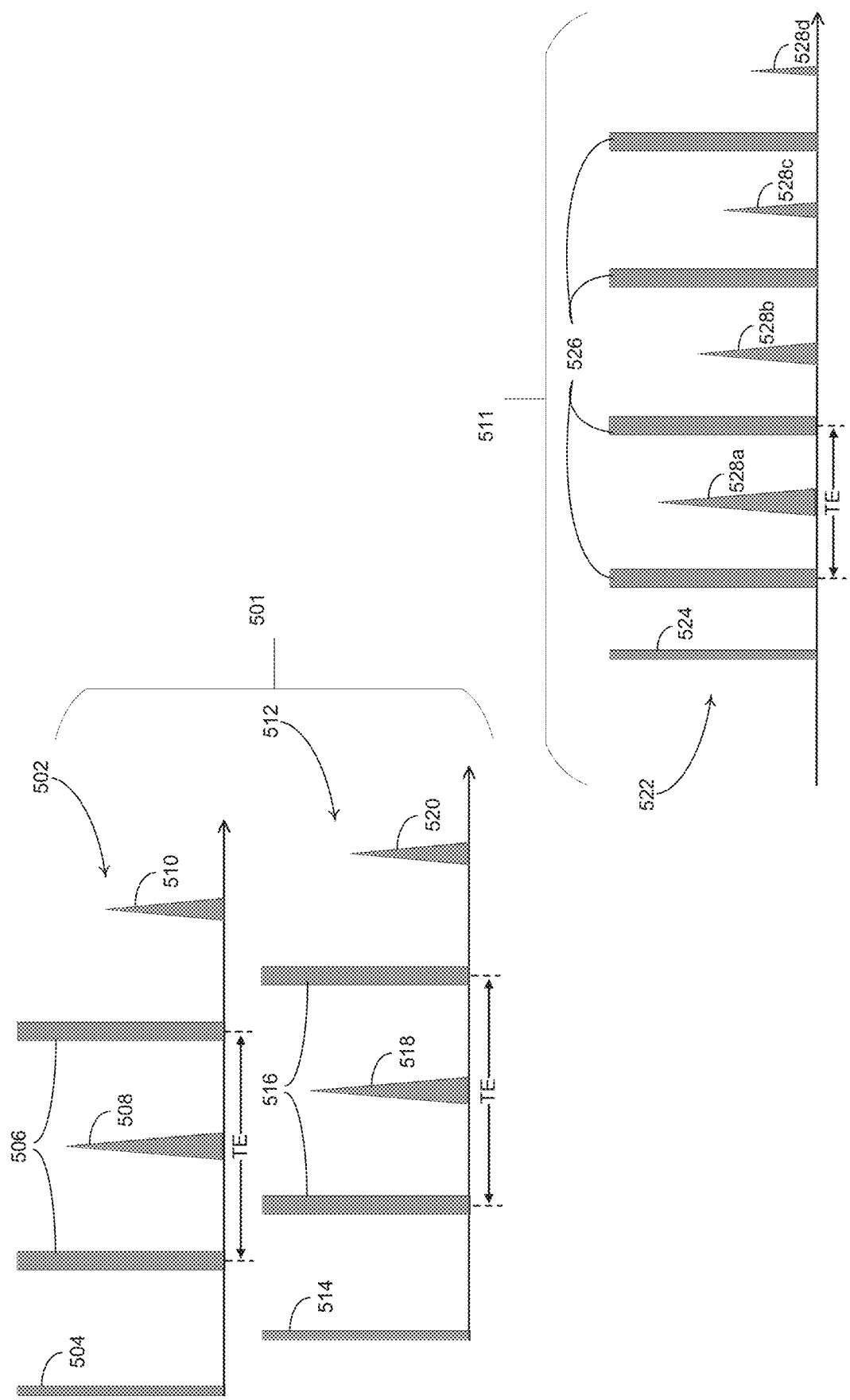
FIG. 5A illustrates sequential signal components of an NMR measurement cycle that may be implemented by an NMR logging tool in some embodiments.

FIG. 5A illustrates sequential signal components of an NMR measurement cycle that may be implemented by an NMR logging tool 402 in some embodiments. The measurement cycle includes a dual signal VM sequence 501 comprising first and second VM pulse sequences 502 and 512 and a corresponding subsequent FM sequence 511. It should be noted that while only a single FM sequence 511 is depicted in FIG. 5A, in alternate embodiments a VM sequence may correspond to two or more successive FM sequences. For pulse sequence 502, VM sequence unit 405 and dipole antenna 409 generate an initial excitation pulse 504. Following excitation pulse 504, VM sequence unit 405 and dipole antenna 409 generate a train of one or more refocusing pulses 506. Refocusing pulses 506 are separated by time intervals, TE, during which monopole antenna 411 and at least one antenna component of dipole antenna 409 detect primary and secondary spin-echo signals 508 and 510.

Pulse sequence 512 may overlap pulse sequence 502, with VM sequence unit 405 and dipole antenna 409 generating an initial excitation pulse 514. Following excitation pulse 514, VM sequence unit 405 and dipole antenna 409 generate a train of one or more refocusing pulses 516. Refocusing pulses 516 are separated by time intervals, TE, during which monopole antenna 411 and at least one antenna component of dipole antenna 409 detect primary and secondary echo signals 518 and 520. As previously disclosed, the signal components that make up the excitation and refocusing pulses in pulse sequence 502 may have a different frequency than the signal components that make up the pulses in pulse sequence 512. In this manner, each of the pulse sequences 502 and 512 excite and derive spin-echo originated phase shift information from two different sensitive volumes. Determining phase shifts resulting from phase accumulation may require a longer echo time. Therefore, VM sequence unit 405 may be configured to implement a TE that is substantially longer that the pulse spacing used for a corresponding FM sequence 511.

FM sequence unit 407 executes the FM sequence 511 immediately following VM sequence 501. FM sequence 511 may or may not be preceded by a polarization phase in addition to the polarization phase executed prior to VM sequence 501. During FM sequence 511, FM sequence unit 407 and dipole antenna 409 generate an RF pulse sequence 522 that includes an initial excitation pulse 524. Following excitation pulse 524, FM sequence unit 407 and dipole antenna 409 generate a train of one or more refocusing pulses 526. Refocusing pulses 526 are separated by time intervals, TE, during which at least one antenna component of dipole antenna 409 detects a train of spin-echo signals that begin with spin-echos 528a-528d and typically continue for several dozen or hundred spin-echos depending on the number of refocusing pulses 526.

To avoid distortion of the thermal equilibrium nuclear magnetization state between the pulse sequences 502 and 512, and between either of sequences 502 and 512 and the subsequent FM sequence 511, the RF pulses of the respective sequences are generated at different resonant/Larmor frequencies. In this manner, different (non-overlapping) formation volumes are excited by the VM sequence pulses and the FM sequence pulses as depicted and described with reference to FIG. 1.

Figure 5B:
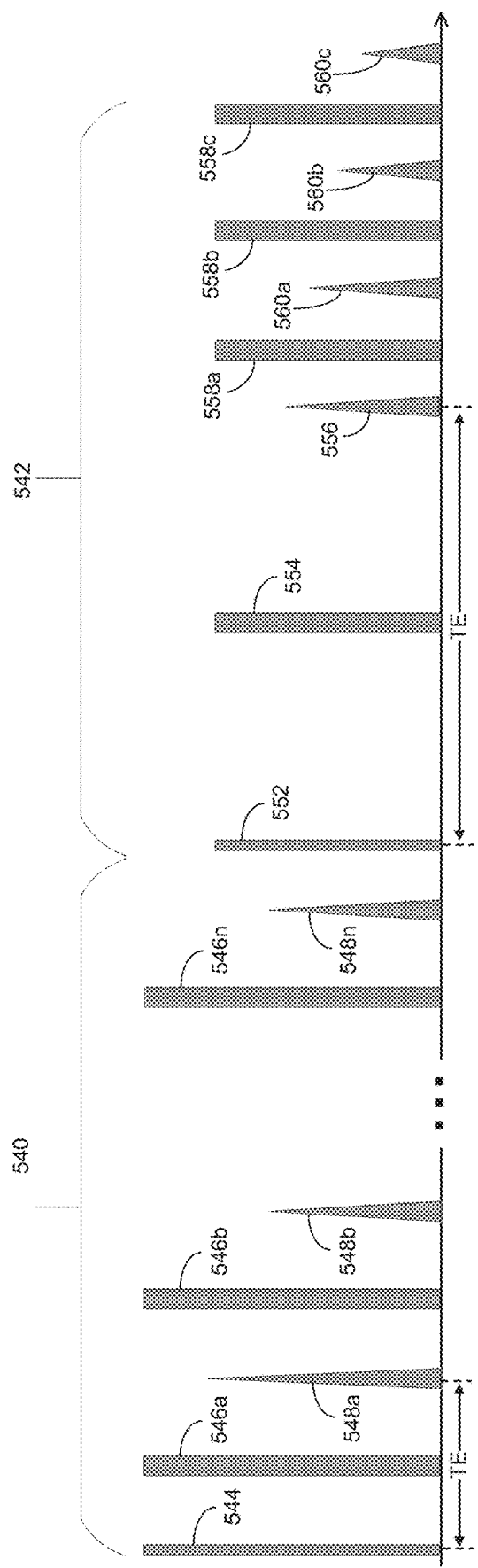
FIG. 5B illustrates sequential signal components of an NMR measurement cycle that may be implemented by an NMR logging tool in some embodiments.

FIG. 5B illustrates sequential signal components of an NMR measurement cycle that may be implemented by an NMR logging tool 402 in some embodiments. In contrast to the measurement cycle depicted in FIG. 5A, the cycle depicted in FIG. 5B includes a VM sequence 542 that follows a corresponding FM sequence 540. FM sequence unit 407 executes the FM sequence 540 immediately following a polarization phase (not depicted). During FM sequence 540, FM sequence unit 407 and dipole antenna 409 generate an RF pulse sequence beginning with an excitation pulse 544 and followed by a train of one or more refocusing pulses 546a-546n. Refocusing pulses 546a-546n are separated by time intervals over which at least one antenna component of dipole antenna 409 detects a train of spin-echo signals 548a-548n that typically number from several dozen to over a hundred depending on the number of refocusing pulses.

VM sequence 542 commences immediately following FM sequence 540 with VM sequence unit 405 and dipole antenna 409 generating an initial excitation pulse 552. Following excitation pulse 552, VM sequence unit 405 and dipole antenna 409 generate a train of one or more refocusing pulses having non-uniform pulse spacing. As shown, the refocusing pulses begin with an initial refocusing pulse 554 that is substantially offset in time from excitation pulse 552. The substantial pulse interval between excitation pulse 552 and initial refocusing pulse 554 results in an induced spin-echo signal 556 detected by a dipole/monopole antenna combination having a correspondingly long echo time, TE. The echo time is substantially longer than the refocusing pulse spacings and corresponding echo times (spin-echo intervals) in FM sequence 540. Following refocusing pulse 554, VM sequence unit 405 and dipole antenna 409 generate a sequence of refocusing pulses 558a-558c having a substantially shorter pulse interval and spin-echo interval than for initial refocusing pulse 554. By including one or more short echo time refocusing pulses following refocusing pulses 554 and 558a, a relatively short VM acquisition phase is maintained with at least one initial phase accumulation pulse (echo from pulse 554) followed by multiple short interval refocusing pulses 558a-558c. When measured using quadrature detection or otherwise, the shorter interval echo signals conserve sufficient phase information to be used for phase shift correction such as by signal stacking.

Since VM sequence 542 follows FM sequence 540, the thermal equilibrium with the same sensitive volume will not occur. Therefore, VM sequence 542 may utilize the same Larmor frequency as used for FM sequence 540. Furthermore, the non-uniform refocusing pulse spacing within VM sequence 542 enables additional spin-echos 560a-560c to be collected and utilized to correct phase shift information collected by measurement of spin-echo 556.

NMR measurement system 400 further includes a measurement processor 420 that may be a physically separate platform or may be incorporated in whole or in part within logging tool 402. Measurement processor 420 is generally configured to receive and process the phase shift data alone or in combination with other data to determine lateral tool velocity, which can be utilized to correct the spin-echo attribute data used to derive formation properties. Measurement processor 420 includes an NMR data pre-processor 422 that receives and processes the spin-echo measurement data from NMR log 406. Pre-processor 422 is configured, using any combination of program logic, to remove noise or other faulty results such as in the form of records having spin-echo attribute values that are outside of pre-specified threshold limits. For instance, pre-processor 422 may be configured to apply low-pass filtering to remove spin-echo measurement values that have been distorted by high-frequency noise effects.

The spin-echo data from pre-processor 422 is received and processed by a motion correction unit 426 that is configured using program instructions and other components to detect and apply lateral velocity values for the logging tool 402 to correct distorted spin-echo attribute data received from NMR log 406. Motion correction unit 426 includes a velocity detector 428 that is configured to detect initial lateral velocity values for logging tool 402 corresponding to each of the VM sequences recorded in phase shift log 412. An initial velocity unit 434 receives the VM sequence phase shift information such as the records in log record 414 to compute an initial lateral velocity for each VM sequence. In some embodiments, initial velocity unit 434 is configured to determine the initial lateral velocity values based on the phase shift values based on the relation:

$$v = \frac{4 \cdot \varphi}{\gamma \cdot G \cdot TE^2} \quad (1)$$

For equation (1), $\varphi = \text{angle}(A_x + iA_y)$ is the phase difference as determined from the two quadrature detection channels with $A_x$ representing the non-quadrature shifted channel component and $A_y$ representing the 90° quadrature shift channel component ($A_x$ and $A_y$ respectively represent the amplitudes of the real and imaginary components of a spin-echo signal). The phase of the echo signal in equation (1) is the phase shift generated by lateral motion of the logging tool. The phase shift is calculated relative to the phase of the echo signal when the tool does not move. The phase of the echo signal when the tool does not move may be known from previous measurement(s) or may be derived from a second echo phase measurement that is substantially unaffected by the tool motion.

Equation (1) is a reformulation of equation (2) in which phase shift of the first spin-echo and the subsequent odd echos (e.g., third, fifth, etc.) in a CPMG induced echo train may be calculated as:

$$\varphi = \gamma \cdot G \cdot v \cdot \left(\frac{TE^2}{4}\right) \quad (2)$$

in which γ is the gyro-magnetic ratio for the nuclei, G is the static magnetic field gradient, v is the tool velocity in the direction of the static magnetic field gradient, and TE is the echo time (time-to-echo equal to the distance between neighboring refocusing RF pulses) in a CPMG pulse/echo train. The static magnetic field gradient may include averaged internal gradients generated in the porous media of the rock formations to be analyzed.

In some embodiments, the lateral velocity may be set for each subsequent measurement cycle as being equal to the determined initial lateral velocity. In other embodiments, velocity detector 428 further includes an instantaneous velocity unit 436 that is configured to modify each of the initial lateral velocity values over time during a corresponding FM sequence based on acceleration measurements. An acceleration sensor 435 disposed on or in proximity to logging tool 402 is configured to detect acceleration and changes in acceleration of logging tool 402 at least during the FM sequences. Acceleration sensor 435 may comprise, in part, an accelerometer configured to determine and record accelerations of logging tool 402 at least during FM sequences.

Instantaneous velocity unit 436 is configured to determine instantaneous values of lateral velocity based, at least in part, on the initial lateral velocity determined by a given VM sequence. The instantaneous velocity values over a corresponding FM sequence are determined using the initial velocity determined by the corresponding VM sequence and on tool acceleration determined over the FM sequence. Unit 436 determines and records a series of instantaneous velocities for each FM sequence recorded in a tool velocity log 438. The instantaneous velocity values for the FM sequences are recorded in tool velocity log 438 as lateral velocity records 440. Each of the records associates a recorded time of measurement with an instantaneous lateral velocity detected/measured at that time. For example, the third row-wise record of lateral velocity records 440 associates a recorded time of "t1.3," that may be an absolute or relative time value, with instantaneous lateral velocity expressed as a two-dimensional value comprising a 1.92 units (e.g., mm/s) $V_x$ value, and a 0.90 units $V_y$ value. In the depicted embodiment, the z-direction is parallel to the borehole length such that the lateral velocity is the resultant vector comprising the $V_x$ and $V_y$ components.

Motion correction unit 426 further includes a spin dynamic unit 430 that is configured to determine formation model correction values that may be used to select and/or correct spin-echo attribute information. Tool velocity values such as for one or more FM sequences may be retrieved as a file 442 by spin dynamic unit 430 and processed by a response model 444 to determine a set of one or more expected spin-echo attribute values (e.g., amplitude) that are predicted by response model 444 to result from the values of the instantaneous velocity values. The determined expected spin-echo attribute values may be used by response model 444 to compute correction coefficients 446 that are applied to a formation properties model that is used to correct the spin-echo information received from NMR log 406. The data may also be correcting by filtering or otherwise removing measured spin-echo information that corresponds contemporaneously with determined instantaneous tool velocity values that exceed a threshold. The corrected data is used to determine formation properties via data inversion and interpretation (represented by the block 424).

Figure 6:
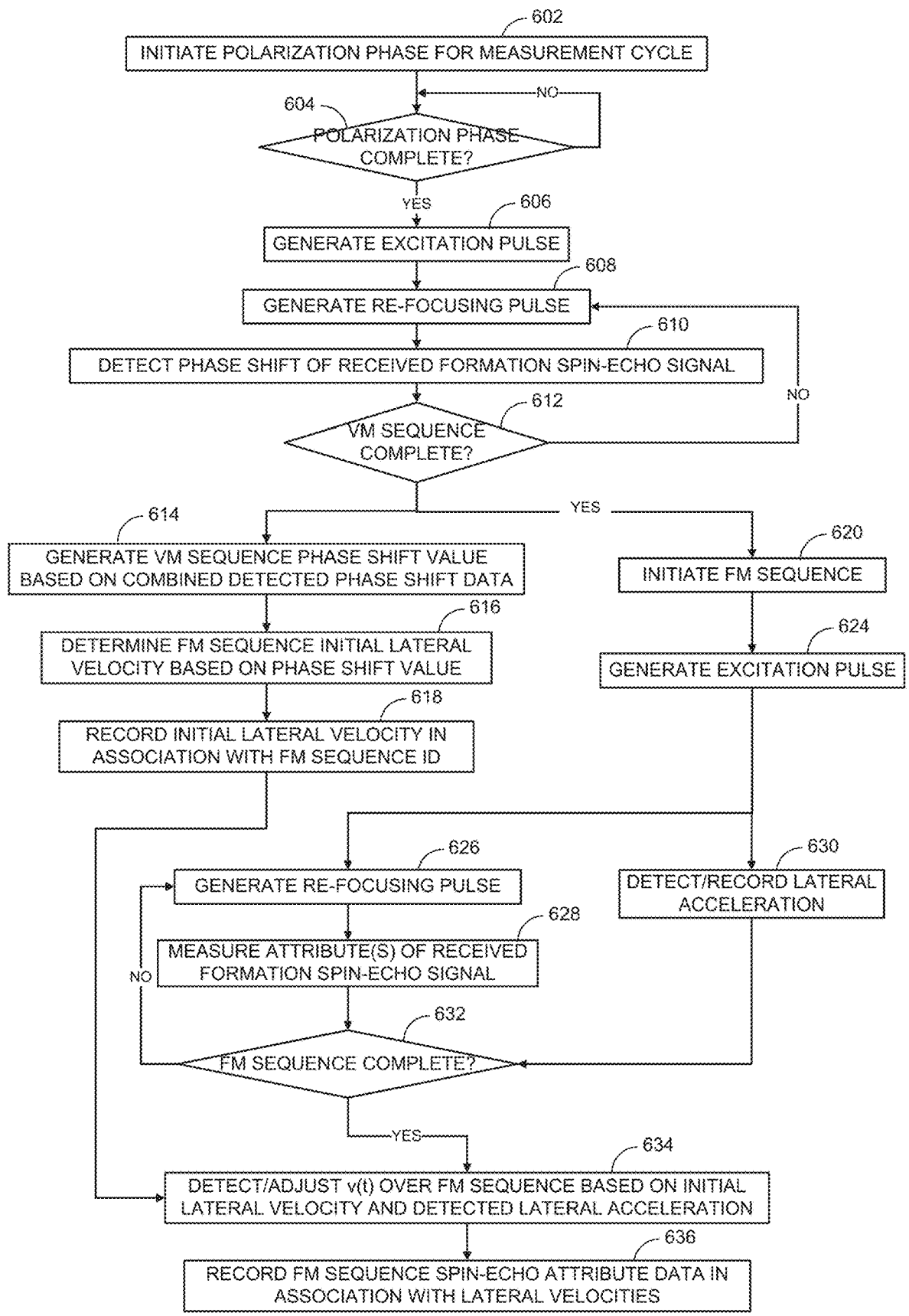
FIG. 6 is a flow diagram depicting operations and functions performed during an NMR measurement cycle in accordance with some embodiments.

FIG. 6 is a flow diagram depicting operations and functions performed during an NMR measurement cycle in accordance with some embodiments. The operations and functions depicted and described with reference to FIG. 6 may be performed by one or more of the systems, subsystems, devices, and components depicted and described with reference to FIGS. 1-5. The process begins as shown at block 602 with an NMR tool executing a polarization phase implemented by magnetic components, such as those described with reference to the magnet assembly depicted in FIG. 1. Upon completion of the polarization phase (block 604), a VM sequence unit such as unit 405 initiates a next VM sequence. To begin the VM sequence at block 606, the VM sequence unit in combination with one or more antennas generate an excitation pulse that, for a CPMG sequence, is sometimes referred to as a 90° pulse. Following the excitation pulse, the VM sequence unit in combination with antenna(s) generate a series of one or more refocusing pulses, sometimes referred to as 180° pulses (block 608).

During the programmably adjustable echo periods/times between each of the refocusing pulses, a monopole antenna in combination with at least one of two antenna components comprising a dipole antenna receives the spin-echo signals induced by the refocusing pulses. At block 610, detection components including a quadrature detector detects phase shifts of the spin-echo signals. The phase shift information may be recorded in association with the VM sequences in which they are measured as described with reference to FIG. 4. Following spin-echo detection, the current VM sequence continues with control passing back to block 608 if the sequence includes an additional refocusing pulse.

Following the VM sequence, control passes to a series of operations for commencing a FM sequence and a series of operations for processing the measured phase shift information. At block 620, an FM sequence unit initiates an FM sequence that may or may not include a distinct polarization phase. To begin the FM sequence, a sequence controller component such as unit 407 generates an excitation pulse (block 624). As shown at block 614, a spin-echo unit, such as spin-echo unit 417, determines/generates one or more phase shift values based on individual or combined phase shifts detected for the one or more VM sequence spin-echo signals at block 610. The phase shift information is received and processed by a velocity detector, such as velocity detector 428 that determines an initial lateral velocity of the logging tool for the FM sequence based on the phase shift information (block 616). At block 618, the measurement processing system records the determined initial lateral velocity in association with a FM sequence. For example, the initial velocity value may be recorded in association with a timestamp corresponding to a point in time during the FM sequence.

The process continues at block 626 with the FM sequence unit and antenna assembly generating a re-focusing pulse. The attributes of a spin-echo signal induced by the re-focusing pulse are measured and recorded at block 628. During the FM sequence, an acceleration sensor detects lateral accelerations and changes in lateral acceleration of the logging tool (block 630). Also at block 630, measurement processor components detect and record the detected lateral acceleration(s). Prior to the completion of the FM sequence, control returns from block 632 to block 626 for generation of a next refocusing pulse. Otherwise, control passes to block 634 with the velocity detector determining instantaneous lateral velocities based on the detected acceleration and determined initial velocity. The process concludes at block 636 with the instantaneous lateral velocity values being processed in conjunction with spin dynamic modeling information to correct the spin-echo attribute information detected during the FM sequence.

Figure 7:
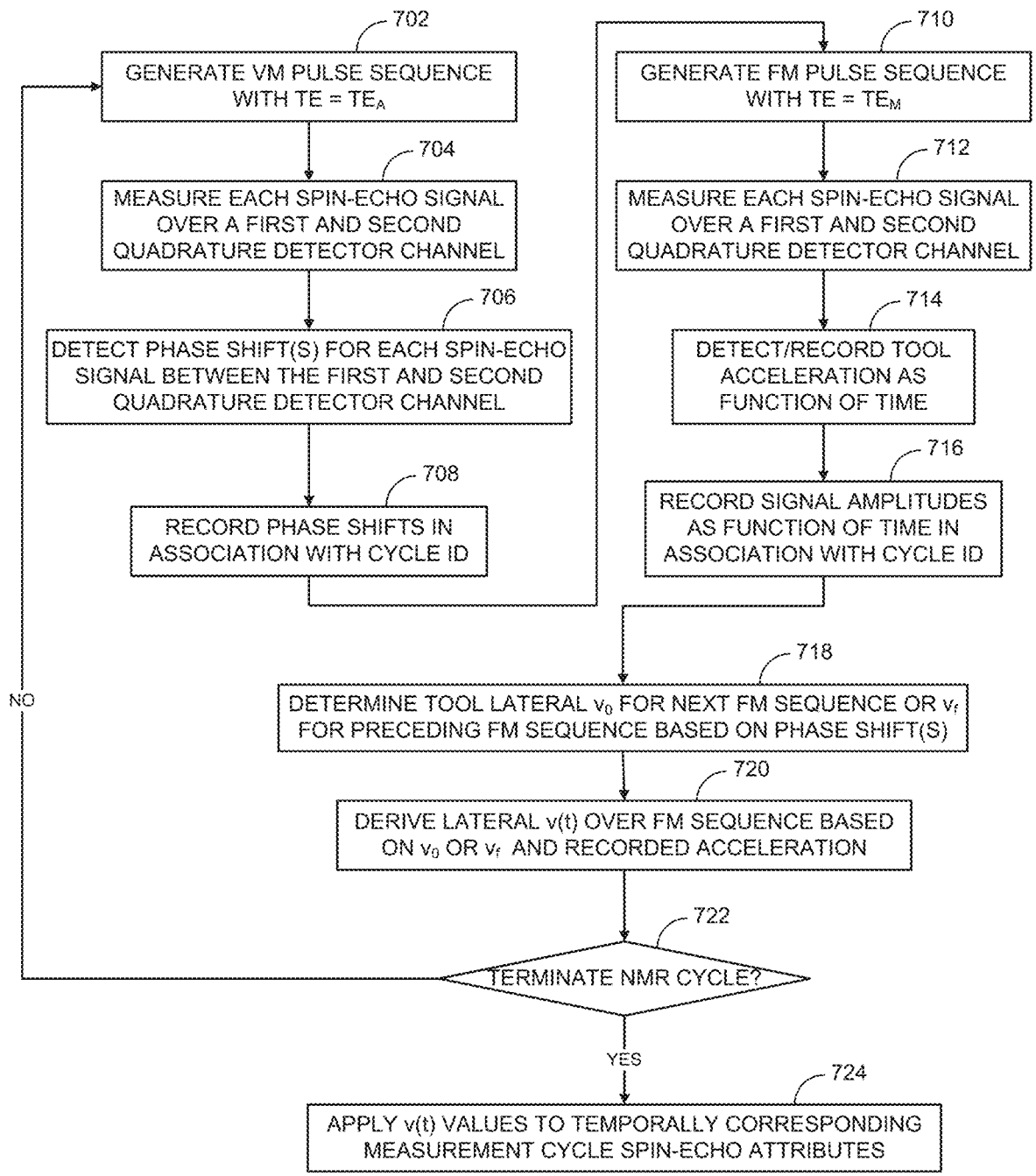
FIG. 7 is a flow diagram illustrating operations and functions for tracking NMR tool motion in accordance with some embodiments.

FIG. 7 is a flow diagram illustrating operations and functions for tracking NMR tool motion in accordance with some embodiments. More specifically, the flow diagram includes operations and functions for determining instantaneous lateral velocities of an NMR tool during FM sequences. The process begins as shown at block 702 with a sequence controller component such as a VM sequence unit generating a VM pulse sequence. The VM pulse sequence comprises an excitation pulse and series of one or more refocusing pulses having pulse intervals that are uniform or are different such as depicted and described with reference to FIG. 5B. The pulse intervals includes at least one interval, TEA, that is long enough to provide sufficient sensitivity of the echo phase to the lateral motion of the tool. An antenna and associated receiver/detector components measure each VM sequence spin-echo signal, including a quadrature detector detecting each of the spin-echo signals using complementary quadrature channels (block 704).

The process continues at block 706 with a spin-echo unit detecting phase shifts of the spin-echo signals as measured between first and second channels of the quadrature detector. The phase shift information is recorded in association with corresponding VM and/or FM sequence ID information such as a text ID and/or corresponding timestamps (block 708). At block 710, an FM sequence unit generates a measurement acquisition phase pulse sequence having an echo time interval of $TE=TE_M$. $TE_M$ is typically as small as achievable given limitations imposed by finite pulse width, after-pulse ringing and acquisition time. The antenna and associated receiver/detector components measure each measurement spin-echo signal, including a quadrature detector detecting each of the spin-echo signals using two quadrature channels (block 712). At block 714 a spin-echo unit detects or otherwise measures spin-echo attributes such as amplitude of the spin-echo signals and decay of the spin-echo train as measured by the quadrature detector. The spin-echo attribute information is recorded in association with corresponding VM and/or FM sequence ID information such as a text ID and/or corresponding timestamps (block 716).

At block 718, a velocity detector receives and processes the phase shift information to calculate either an initial lateral velocity or a final lateral velocity for the tool for a corresponding next FM sequence. If the VM sequence (blocks 702-706) is executed prior to the corresponding FM sequence (blocks 710-714), the velocity detector processes the phase shift information to determine an initial lateral velocity of the tool during the FM sequence. If the VM sequence (blocks 702-706) is following the corresponding FM sequence (blocks 710-714), the velocity detector processes the phase shift information to determine a final lateral velocity of the tool during the FM sequence. Tool acceleration information collected during an acquisition phase of the FM sequence is used in combination with the initial or final lateral velocity to determine multiple instantaneous lateral velocities of the tool during the FM sequence (block 720). For example, if the VM sequence follows the corresponding FM sequence, the acceleration values were measured and recorded previously during the FM sequence and are used to computer earlier instantaneous tool velocities during the FM sequence. If the VM sequence precedes the corresponding FM sequence, the acceleration values are measured and recorded following the FM sequence and are used to computer the later instantaneous tool velocities during the FM sequence. If the NMR measurement cycle continues at block 722, control returns to block 702. Otherwise, the process ends at block 724 with formation modeling tools utilizing the instantaneous lateral tool velocity information to correct for distorted spin-echo attributed data.

Figure 8:
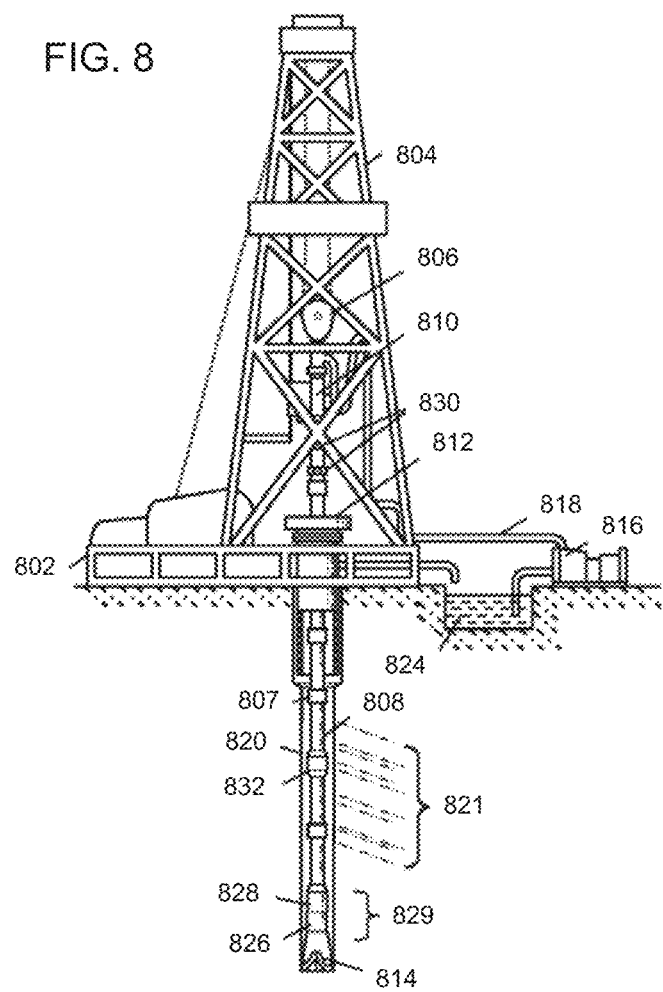
FIG. 8 depicts an example logging while drilling (LWD) system configured to determine lateral tool motion during NMR logging in accordance with some embodiments.

FIG. 8 shows a suitable context for describing the operation of the disclosed systems and methods. In the illustrated logging while drilling (LWD) environment, a drilling platform 802 is equipped with a derrick 804 that supports a hoist 806 for raising and lowering a drill string 808. The hoist 806 suspends a top drive 810 that rotates the drill string 808 as it is lowered through the well head 812. The drill string 808 can be extended by temporarily anchoring the drill string 808 at the well head 812 and using the hoist 806 to position and attach new drill pipe sections with threaded connectors 807. Connected to the lower end of the drill string 808 is a drill bit 814. As bit 814 rotates, it creates a borehole 820 that passes through various formations 821. A pump 816 circulates drilling fluid through a supply pipe 818 to top drive 810, through the interior of drill string 808, through orifices in drill bit 814, back to the surface via the annulus around drill string 808, and into a retention pit 824.

An NMR logging tool 826 is integrated into a bottom-hole assembly 829 near the bit 814. The NMR logging tool 826 may take the form of a drill collar, i.e., a thick-walled tubular that provides weight and rigidity to aid the drilling process. As the bit extends the borehole 820 through the formations, the bottomhole assembly 829 collects spin-echo signal measurements (using tool 826) and potentially other measurements such as the tool orientation and position, borehole size, and various other drilling conditions.

In wells employing acoustic telemetry for LWD, downhole sensors (including NMR logging tool 826) are coupled to a telemetry module 828 having an acoustic telemetry transmitter that transmits telemetry signals in the form of acoustic vibrations in the tubing wall of drill string 808. An acoustic telemetry receiver array 830 may be coupled to tubing below the top drive 810 to receive transmitted telemetry signals. One or more repeater modules 832 may be optionally provided along the drill string to receive and retransmit the telemetry signals. Of course other telemetry techniques can be employed including mud pulse telemetry, electromagnetic telemetry, and wired drill pipe telemetry. Many telemetry techniques also offer the ability to transfer commands from the surface to the bottomhole assembly 829, thereby enabling adjustment of the configuration and operating parameters of NMR logging tool 826. In some embodiments, the telemetry module 828 also or alternatively stores measurements for later retrieval when the bottomhole assembly 829 returns to the surface.

Figure 9:
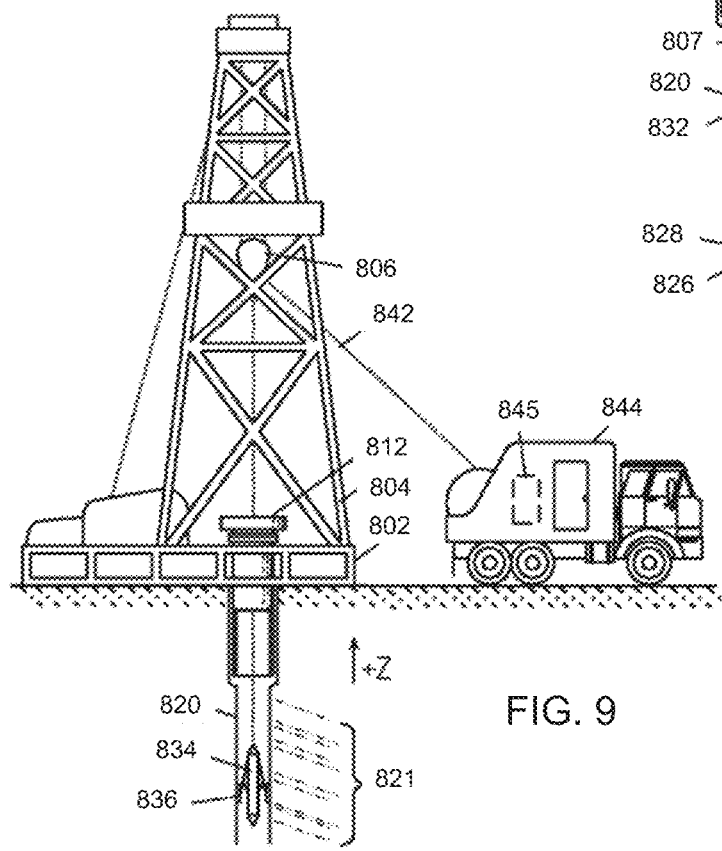
FIG. 9 depicts an example wireline (WL) test system configured to determine lateral tool motion during NMR logging in accordance with some embodiments.

At various times during the drilling process, the drill string 808 is removed from the borehole 820 as shown in FIG. 9. Once the drill string has been removed, logging operations can be conducted using a wireline logging tool 834, i.e., a sensing instrument sonde suspended by a cable 842 having conductors for transporting power to the tool 834 and communications from the tool 834 to the surface. An NMR logging portion of the wireline logging tool 834 may have centralizing arms 836 that center the tool 834 within the borehole 820 as the tool 834 is pulled uphole. A logging facility 844 collects measurements from the wireline logging tool 834, and includes computing facilities 845 for processing and storing the measurements gathered by the wireline logging tool 834.

Example Computer

Figure 10:
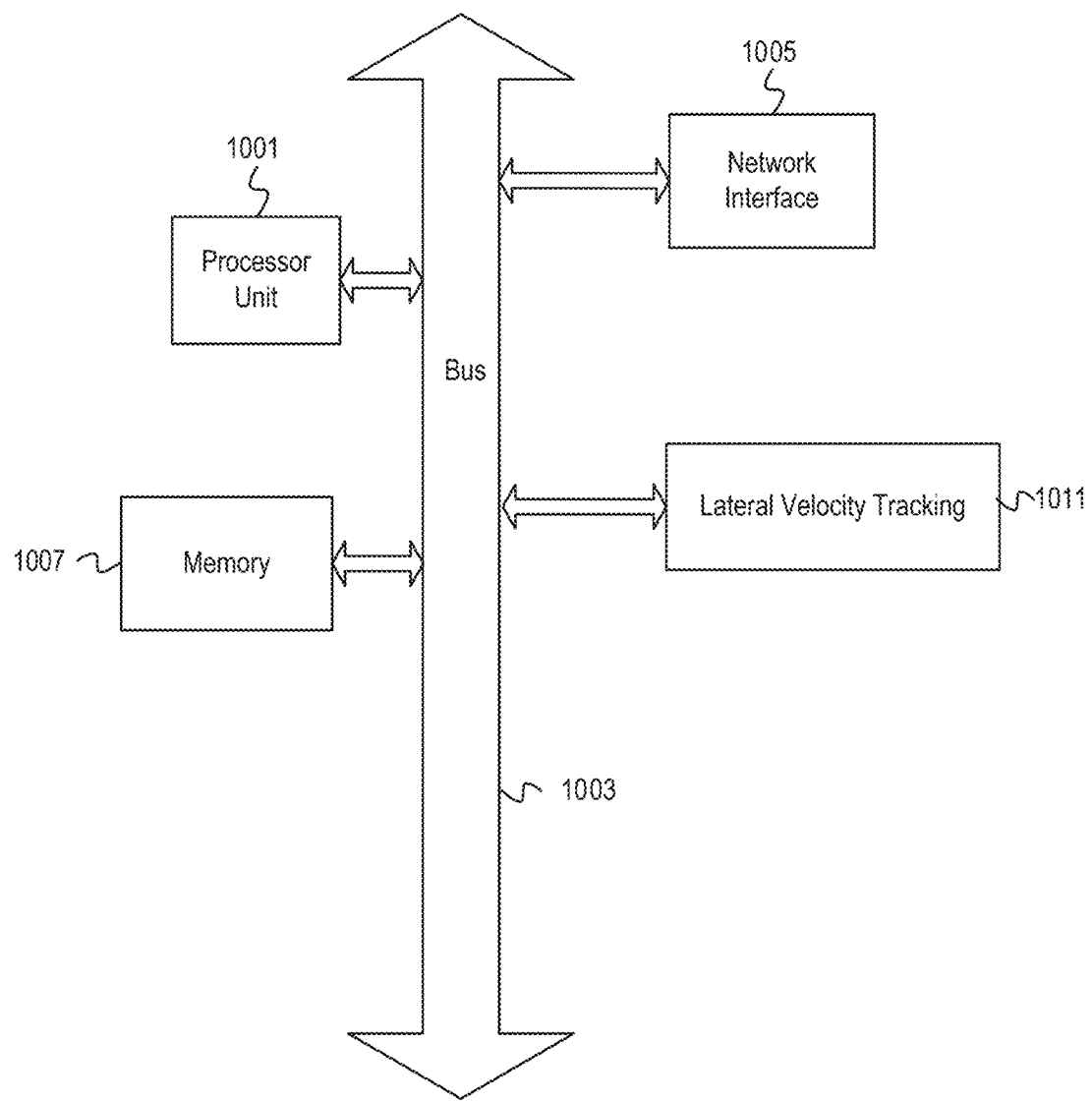
FIG. 10 is a block diagram depicting an example computer system that may be utilized to implement NMR tool motion tracking in accordance with some embodiments.

FIG. 10 depicts an example computer, according to some embodiments. The computer system includes a processor 1001 (possibly including multiple processors, multiple cores, multiple nodes, and/or implementing multi-threading, etc.). The computer system includes a memory 1007. The memory 1007 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1003 (e.g., PCI, ISA, PCI-Express, Hyper-Transport® bus, InfiniBand® bus, NuBus, etc.) and a network interface 1005 (e.g., a Fiber Channel interface, an Ethernet interface, an internet small computer system interface, SONET interface, wireless interface, etc.).

The system also includes a velocity tracking system 1011, which may be hardware, software, firmware, or a combination thereof depicted and described with reference to FIGS. 1-7. For example, the velocity tracking system 1011 may comprise instructions executable by the processor 1001. Any one of the previously described functionalities may be partially (or entirely) implemented in hardware and/or on the processor 1001. For example, the functionality may be implemented with an application specific integrated circuit, in logic implemented in the processor 1001, in a co-processor on a peripheral device or card, etc. The velocity tracking system 1011 uses a monopole receiving antenna during a velocity measurement sequence to determine velocity-related phase shifts. The phase shift information is utilized to determine an initial velocity value that is associated with the beginning of a formation measurement sequence that immediately follows the velocity measurement sequence, or is associated with the end of a formation measurement sequence that immediately precedes the velocity measurement sequence. Additional realizations may include fewer or more components not expressly illustrated in FIG. 10 (e.g., video cards, audio cards, additional network interfaces, peripheral devices, etc.). The processor 1001 and the network interface 1005 are coupled to the bus 1003. Although illustrated as being coupled to the bus 1003, the memory 1007 may be coupled to the processor 1001.

Variations

While the aspects of the disclosure are described with reference to various implementations and exploitations, it will be understood that these aspects are illustrative and that the scope of the claims is not limited to them. Plural instances may be provided for components, operations or structures described herein as a single instance. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device. Program code embodied on a machine readable medium may be transmitted using any appropriate medium, including but not limited to wireless, wireline, optical fiber cable, RF, etc., or any suitable combination of the foregoing.

Use of the phrase "at least one of" preceding a list with the conjunction "and" should not be treated as an exclusive list and should not be construed as a list of categories with one item from each category, unless specifically stated otherwise.

EXAMPLE EMBODIMENTS

Embodiment 1

A method comprising: detecting a phase shift for one or more spin-echo signals received by a nuclear magnetic resonance (NMR) tool during a velocity measurement sequence that corresponds to at least one formation measurement sequence; and determining a lateral velocity of the NMR tool based, at least in part, on the detected phase shift.

Embodiment 2

The method of Embodiment 1, wherein an acceleration sensor disposed on or in proximity to the NMR tool is configured to detect lateral acceleration of the NMR tool, and wherein said method further comprises determining instant lateral velocities of the NMR tool over the at least one formation measurement sequence including: detecting, by the acceleration sensor, lateral acceleration of the NMR tool during the at least one formation measurement sequence; and generating instant lateral velocity values based, at least in part, on the determined lateral velocity and one or more detected lateral accelerations of the NMR tool.

Embodiment 3

The method of Embodiments 1-2, further comprising: measuring spin-echo attributes during the at least one formation measurement sequence; determining formation model coefficients based, at least in part, on the measured spin-echo attributes; and modifying one or more of the formation model coefficients based, at least in part, on the generated instant lateral velocity values.

Embodiment 4

The method of Embodiments 1-3, further comprising: measuring spin-echo attributes during the at least one formation measurement sequence; and filtering the spin-echo attributes used to determine the formation model coefficients based, at least in part, on whether contemporaneous instant lateral velocities exceed a threshold.

Embodiment 5

The method of Embodiments 1-4, wherein the NMR tool includes a dipole antenna and a monopole antenna, said detecting the phase shift comprising detecting the phase shift based, at least in part, on combined signal measurements of the one or more spin-echo signals received on the dipole antenna and the monopole antenna.

Embodiment 6

The method of Embodiments 1-5, further comprising: executing velocity measurement sequences interleaved between sets of at least one formation measurement sequence, including, detecting a phase shift for the one or more spin-echo signals during each of the velocity measurement sequences; and determining a lateral velocity for each of the sets of at least one formation measurement sequence based, at least in part, on the detected phase shifts.

Embodiment 7

The method of Embodiments 1-6, further comprising: executing the at least one formation measurement sequence including, generating a first sequence of magnetic RF pulses; and detecting signal attributes of a series of spin-echo signals induced by the first sequence of magnetic RF pulses; and executing the corresponding velocity measurement sequence including, generating a second sequence of magnetic RF pulses; and detecting a phase difference for at least one spin-echo signal induced by the second sequence of magnetic RF pulses.

Embodiment 8

The method of Embodiments 1-7, wherein the corresponding velocity measurement sequence is executed after the at least one formation measurement sequence.

Embodiment 9

The method of Embodiments 1-8, wherein said executing the corresponding velocity measurement sequence comprises: generating an excitation pulse; generating one or more initial refocusing pulses following the excitation pulse having a first pulse interval; and generating one or more subsequent refocusing pulses following the one or more initial refocusing pulses having a second pulse interval that is shorter than the first pulse interval.

Embodiment 10

The method of Embodiments 1-9, wherein said detecting a phase difference for at least one spin-echo signal comprises: measuring spin-echo signals received following each of the one or more initial refocusing pulses; measuring spin-echo signals received following each of the one or more subsequent refocusing pulses; and correcting the measurements of the spin-echo signal received following each of the one or more initial refocusing pulses based on the measurements of the spin-echo signals received following each of the one or more subsequent refocusing pulses.

Embodiment 11

The method of Embodiments 1-10, wherein the corresponding velocity measurement sequence precedes the at least one formation measurement sequence, wherein said generating a first sequence of magnetic RF pulses comprises generating an excitation pulse and a refocusing pulse having a first frequency, and wherein said generating a second sequence of magnetic RF pulses comprises generating an excitation pulse and a refocusing pulse having a second frequency.

Embodiment 12

The method of Embodiments 1-11, wherein said generating the first sequence of magnetic RF pulses comprises generating a first excitation pulse and a first refocusing pulse at a first frequency, and wherein said generating the second sequence of magnetic RF pulses comprises generating a second excitation pulse and a second refocusing pulse at a second frequency and generating a third excitation pulse and a third refocusing pulse at a third frequency.

Embodiment 13

An apparatus comprising: a nuclear magnetic resonance (NMR) tool comprising a quadrature detector configured to detect a phase shift for one or more spin-echo signals received during an a velocity measurement sequence that corresponds to at least one formation measurement sequence; and a measurement processing system comprising: a processor; and a machine-readable medium having program code executable by the processor to cause the apparatus to determine a lateral velocity of the NMR tool based, at least in part, on the detected phase shift.

Embodiment 14

The apparatus of Embodiment 13, further comprising an acceleration sensor disposed on or in proximity to the NMR tool, wherein the acceleration sensor is configured to detect lateral acceleration of the NMR tool during the at least one formation measurement sequence, and wherein the program code includes program code executable by the processor to cause the apparatus to generate instant lateral velocity values based, at least in part, on the determined lateral velocity and one or more detected lateral accelerations of the NMR tool.

Embodiment 15

The apparatus of Embodiments 13 and 14, wherein the NMR tool includes: an antenna assembly communicatively coupled with the quadrature detector and configured to receive spin-echo signals during the at least one formation measurement sequence, wherein the quadrature detector is configured to detect attributes of the spin-echo signals received during the at least one formation measurement sequence; and wherein the program code includes program code executable by the processor to cause the apparatus to, determine formation model coefficients based, at least in part, on the detected spin-echo attributes; and modify one or more of the formation model coefficients based, at least in part, on the generated instant lateral velocity values.

Embodiment 16

The apparatus of Embodiments 13-15, wherein the NMR tool includes a dipole antenna and a monopole antenna, and wherein the quadrature detector is coupled with the dipole antenna and the monopole antenna and configured to detect the phase shift by combined signal measurements of the one or more spin-echo signals received on the dipole antenna and the monopole antenna.

Embodiment 17

The apparatus of Embodiments 13-16, wherein the NMR tool is configured to: execute the at least one formation measurement sequence including, generating a first sequence of magnetic RF pulses; and detecting signal attributes of a series of spin-echo signals induced by the first sequence of magnetic RF pulses; and execute the corresponding velocity measurement sequence including, generating a second sequence of magnetic RF pulses; and detecting a phase shift for at least one spin-echo signal induced by the second sequence of magnetic RF pulses.

Embodiment 18

The apparatus of Embodiments 13-17, wherein the corresponding velocity measurement sequence precedes the at least one formation measurement sequence, wherein said generating a first sequence of magnetic RF pulses comprises generating an excitation pulse and a refocusing pulse having a first frequency, and wherein said generating a second sequence of magnetic RF pulses comprises generating an excitation pulse and a refocusing pulse having a second frequency.

Embodiment 19

The apparatus of Embodiments 13-17, wherein said generating the first sequence of magnetic RF pulses comprises generating a first excitation pulse and a first refocusing pulse at a first frequency, and wherein said generating the second sequence of magnetic RF pulses comprises generating a second excitation pulse and a second refocusing pulse at a second frequency and generating a third excitation pulse and a third refocusing pulse at a third frequency.

Embodiment 20

One or more non-transitory machine-readable media comprising program code for tracking lateral motion of a nuclear magnetic resonance (NMR) tool, the program code to: detect a phase shift for one or more spin-echo signals received by the NMR tool during a velocity measurement sequence that corresponds to at least one formation measurement sequence; and determine a lateral velocity of the NMR tool based, at least in part, on the detected phase shift.

What is claimed is:

1. A method comprising:
generating a velocity measurement pulse sequence and at least one corresponding formation measurement pulse sequence;
detecting a phase shift for one or more spin-echo signals received by a nuclear magnetic resonance (NMR) tool during the velocity measurement pulse sequence; and
determining a lateral velocity of the NMR tool based, at least in part, on the detected phase shift.

2. The method of claim 1, wherein an acceleration sensor disposed on or in proximity to the NMR tool is configured to detect lateral acceleration of the NMR tool, and wherein said method further comprises determining instant lateral velocities of the NMR tool over the at least one formation measurement sequence including:
detecting, by the acceleration sensor, lateral acceleration of the NMR tool during the at least one formation measurement sequence; and
generating instant lateral velocity values based, at least in part, on the determined lateral velocity and one or more detected lateral accelerations of the NMR tool.

3. The method of claim 2, further comprising:
measuring spin-echo attributes during the at least one formation measurement sequence;
determining formation model coefficients based, at least in part, on the measured spin-echo attributes; and
modifying one or more of the formation model coefficients based, at least in part, on the generated instant lateral velocity values.

4. The method of claim 2, further comprising:
measuring spin-echo attributes during the at least one formation measurement sequence; and
filtering the spin-echo attributes used to determine the formation model coefficients based, at least in part, on whether contemporaneous instant lateral velocities exceed a threshold.

5. The method of claim 1, wherein the NMR tool includes a dipole antenna and a monopole antenna, said detecting the phase shift comprising detecting the phase shift based, at least in part, on combined signal measurements of the one or more spin-echo signals received on the dipole antenna and the monopole antenna.

6. The method of claim 1, further comprising:
executing velocity measurement sequences interleaved between sets of at least one formation measurement sequence, including,
detecting a phase shift for the one or more spin-echo signals during each of the velocity measurement sequences; and
determining a lateral velocity for each of the sets of at least one formation measurement sequence based, at least in part, on the detected phase shifts.

7. The method of claim 1, further comprising:
executing the at least one formation measurement sequence including,
generating a first sequence of magnetic RF pulses; and
detecting signal attributes of a series of spin-echo signals induced by the first sequence of magnetic RF pulses; and
executing the corresponding velocity measurement sequence including,
generating a second sequence of magnetic RF pulses; and
detecting a phase difference for at least one spin-echo signal induced by the second sequence of magnetic RF pulses.

8. The method of claim 7, wherein the corresponding velocity measurement sequence is executed after the at least one formation measurement sequence.

9. The method of claim 8, wherein said executing the corresponding velocity measurement sequence comprises:
generating an excitation pulse;
generating one or more initial refocusing pulses following the excitation pulse having a first pulse interval; and
generating one or more subsequent refocusing pulses following the one or more initial refocusing pulses having a second pulse interval that is shorter than the first pulse interval.

10. The method of claim 9, wherein said detecting a phase difference for at least one spin-echo signal comprises:
measuring spin-echo signals received following each of the one or more initial refocusing pulses;
measuring spin-echo signals received following each of the one or more subsequent refocusing pulses; and
correcting the measurements of the spin-echo signal received following each of the one or more initial refocusing pulses based on the measurements of the spin-echo signals received following each of the one or more subsequent refocusing pulses.

11. The method of claim 7, wherein said generating the first sequence of magnetic RF pulses comprises generating an excitation pulse and a refocusing pulse having a first frequency, and wherein said generating the second sequence of magnetic RF pulses comprises generating an excitation pulse and a refocusing pulse having a second frequency.

12. The method of claim 7, wherein said generating the first sequence of magnetic RF pulses comprises generating a first excitation pulse and a first refocusing pulse having a first frequency, and wherein said generating the second sequence of magnetic RF pulses comprises generating a second excitation pulse and a second refocusing pulse having a second frequency and generating a third excitation pulse and a third refocusing pulse having a third frequency.

13. An apparatus comprising:
  a nuclear magnetic resonance (NMR) tool comprising a quadrature detector configured to,
    generate a velocity measurement pulse sequence and at least one corresponding formation measurement pulse sequence; and
    detect a phase shift for one or more spin-echo signals received during the velocity measurement sequence that; and
  a measurement processing system comprising:
    a processor; and
    a machine-readable medium having program code executable by the processor to cause the apparatus to determine a lateral velocity of the NMR tool based, at least in part, on the detected phase shift.

14. The apparatus of claim 13, further comprising an acceleration sensor disposed on or in proximity to the NMR tool, wherein the acceleration sensor is configured to detect lateral acceleration of the NMR tool during the at least one formation measurement sequence, and wherein the program code includes program code executable by the processor to cause the apparatus to generate instant lateral velocity values based, at least in part, on the determined lateral velocity and one or more detected lateral accelerations of the NMR tool.

15. The apparatus of claim 14, wherein the NMR tool includes an antenna assembly communicatively coupled with the quadrature detector and configured to receive spin-echo signals during the at least one formation measurement sequence, wherein the quadrature detector is configured to detect attributes of the spin-echo signals received during the at least one formation measurement sequence.

16. The apparatus of claim 15, wherein the antenna assembly includes a dipole antenna and a monopole antenna, and wherein the quadrature detector is coupled with the dipole antenna and the monopole antenna and configured to detect the phase shift by combined signal measurements of the one or more spin-echo signals received on the dipole antenna and the monopole antenna.

17. The apparatus of claim 13, wherein the NMR tool is configured to:
  execute the at least one formation measurement sequence including,
    generating a first sequence of magnetic RF pulses; and
    detecting signal attributes of a series of spin-echo signals induced by the first sequence of magnetic RF pulses; and
  execute the corresponding velocity measurement sequence including,
    generating a second sequence of magnetic RF pulses; and
    detecting a phase shift for at least one spin-echo signal induced by the second sequence of magnetic RF pulses.

18. The apparatus of claim 17, wherein said generating the first sequence of magnetic RF pulses comprises generating an excitation pulse and a refocusing pulse having a first frequency, and wherein said generating the second sequence of magnetic RF pulses comprises generating an excitation pulse and a refocusing pulse having a second frequency.

19. The apparatus of claim 17, wherein said generating the first sequence of magnetic RF pulses comprises generating a first excitation pulse and a first refocusing pulse having a first frequency, and wherein said generating the second sequence of magnetic RF pulses comprises generating a second excitation pulse and a second refocusing pulse having a second frequency and generating a third excitation pulse and a third refocusing pulse having a third frequency.

\* \* \* \* \*